March 31, 1931.  J. P. RATIGAN  1,798,557

HORSE HEAD

Filed April 23, 1928   2 Sheets-Sheet 1

Inventor
James P. Ratigan
By Lyon & Lyon
Attorneys

March 31, 1931.  J. P. RATIGAN  1,798,557

HORSE HEAD

Filed April 23, 1928  2 Sheets-Sheet 2

Inventor
James P. Ratigan
By Lyon & Lyon
Attorneys

Patented Mar. 31, 1931

1,798,557

UNITED STATES PATENT OFFICE

JAMES P. RATIGAN, OF LOS ANGELES, CALIFORNIA

HORSE HEAD

Application filed April 23, 1928. Serial No. 272,267.

This invention relates to adjustable horse heads, a type of beam hanger, so termed in the oil fields, provided with an arcuate grooved member in which a flexible member loosely rests for connecting the operating member to the polish rod of a pump, so that the pull on the polish rod will be in exact alignment with the axis of said polish rod, thus avoiding side thrust on or flexing of the polish rod as it operates.

An object of this invention is to provide for ready adjustment of the arcuate member to different angles relative to the operating member on which it is mounted so that the flexible member, to which the polish rod is connected, may be caused to operate in the desired path, with the flexible member axially aligned with the polish rod and extending downwardly from the arcuate member tangential therewith. In other words, there is provided a device for holding out the arcuate member as the operating member moves on its up stroke and this device is adjustable.

Another object is to make provision for lateral swinging between the beam hanger and the operating member on which it rests so that, in the event of the upper face of the operating member not being horizontal transversely of said operating member, the beam hanger will self-align itself in order to prevent bending strains coming upon the arcuate member tending to break the same.

Another object is to make provision for convenient securing of the horse head to and removal thereof from the operating member.

Another object is to provide for adjustment of the horse head into different positions along the operating member so that, after the horse head has been mounted on the operating member, adjustment thereof can be made to cause the upward pull on the flexible member, attached to the polish rod, to come directly over the axis of the polish rod.

Other objects and advantages will appear in the subjoined detailed description.

The accompanying drawings illustrate the invention:

Figure 1:
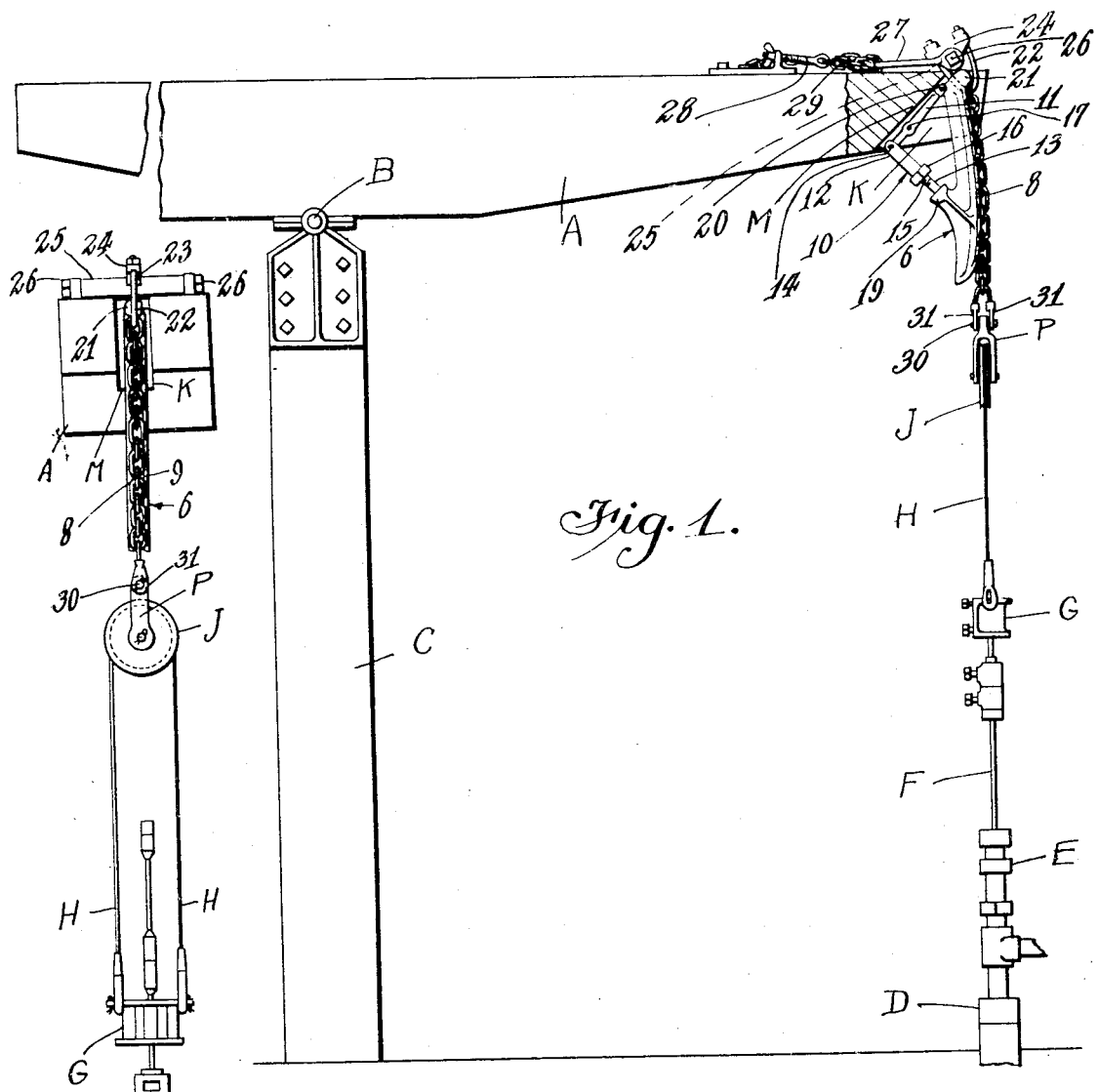
Fig. 1 is a side elevation of a horse head constructed in accordance with the provisions of this invention, an operating member, a polish rod and the connections between the horse head and polish rod also being shown. A portion of the operating member is broken away to contract the view.

An operating member is indicated at A, fulcrumed at B on a standard or Samson post C. Pump tubing is indicated at D and on the upper end thereof is a stuffing box E through which operates a polish rod F. A grip G engages the polish rod and is suspended by a rein or reins from a grooved rotatably mounted member J. This newly invented horse head connects the operating member A, which, in this instance, is in the form of a walking beam, to the member J that supports the reins H. In this instance, the reins H constitute a single flexible member extending over the grooved member J and engaging in said groove, the ends of the reins being attached to the grip G.

The horse head comprises a stem 6 which, in this instance, is of arcuate form and in one face thereof is an arcuate groove 7 in which rides a flexible member 8 which may be of any suitable construction. In this instance, the member 8 is shown in the form of a chain, alternate links being adapted to engage edgewise in the groove 7, while the links connecting said alternate links rest against flat faces 9 at the sides of the groove 7. The groove 7 is of slightly greater depth than the diameter of those portions of the links that engage in the groove, so that said portions will not rest against the bottom wall of the groove. Thus the intermediate links mentioned above will always rest against the faces 9, the groove 7 simply functioning to prevent the flexible member from slipping off of the stem.

The operating member A is provided in one end with the usual slot K having an inwardly and downwardly slanting rear wall M. The device for holding the stem 6 at the desired angle is indicated, in general, by the character 10. Said device is engaged by the rear wall M of the slot K and comprises an upper section 11, an intermediate section 12, and a lower section 13 which is adjustably connected to the section 12. The sections 11, 12 are hingedly connected, the hinge pin being indicated at 14. The adjustment between the sections 12, 13 is effected, in this instance, by a screw-threaded portion 15 of the section 13 screwed into the section 12.

A lock nut 16 on the threaded portion 15 engages the lower end of the section 12. The hinge pin 14 may be selectively engaged with any one of a number of holes 17 in the section 11 so as to provide for relatively great adjustments in the angle of the section 11 relative to the stem 6. The lower end of the section 13, which is in the form of a rod, is preferably rounded, as indicated at 18 and engages in a socket 19 formed in one side of the stem 6. The axis of the socket 19 is aslant upwardly relative to the longitudinal axis of the stem 6, and the angle of said slant is approximately 45 degrees relative to said axis. The diameter of the socket 19 is considerably greater than the diameter of the section 13, so that said section can properly seat in the socket when adjusted to different angles. The difference in angular positions of the section 13 occurs when the sections 12, 13 are relatively adjusted or when the hinge pin 14 is changed from one hole 17 to another of said holes. From the foregoing it will be readily seen that the device 10 for holding the stem 6 at the desired angle relative to the operating member is loosely connected at its lower end to the stem 6.

The upper end of the section 11 is pivoted or hinged at 20 to the upper portion of the stem 6.

In order to pivotally support the flexible member 8 on the operating member A, the upper end of the stem is provided with an eye 21 through which extends a U-bolt 22. The ends of the U-bolt 22 pass through slots 23 in a bearing member 24 which loosely rests on a bar 25 that seats at its end portions on the upper face of the operating member A.

Figure 2:
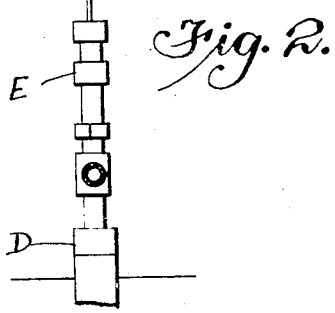
Fig. 2 is an elevation of Fig. 1 from the right thereof, omitting the Samson post.
Figures 3, 4:
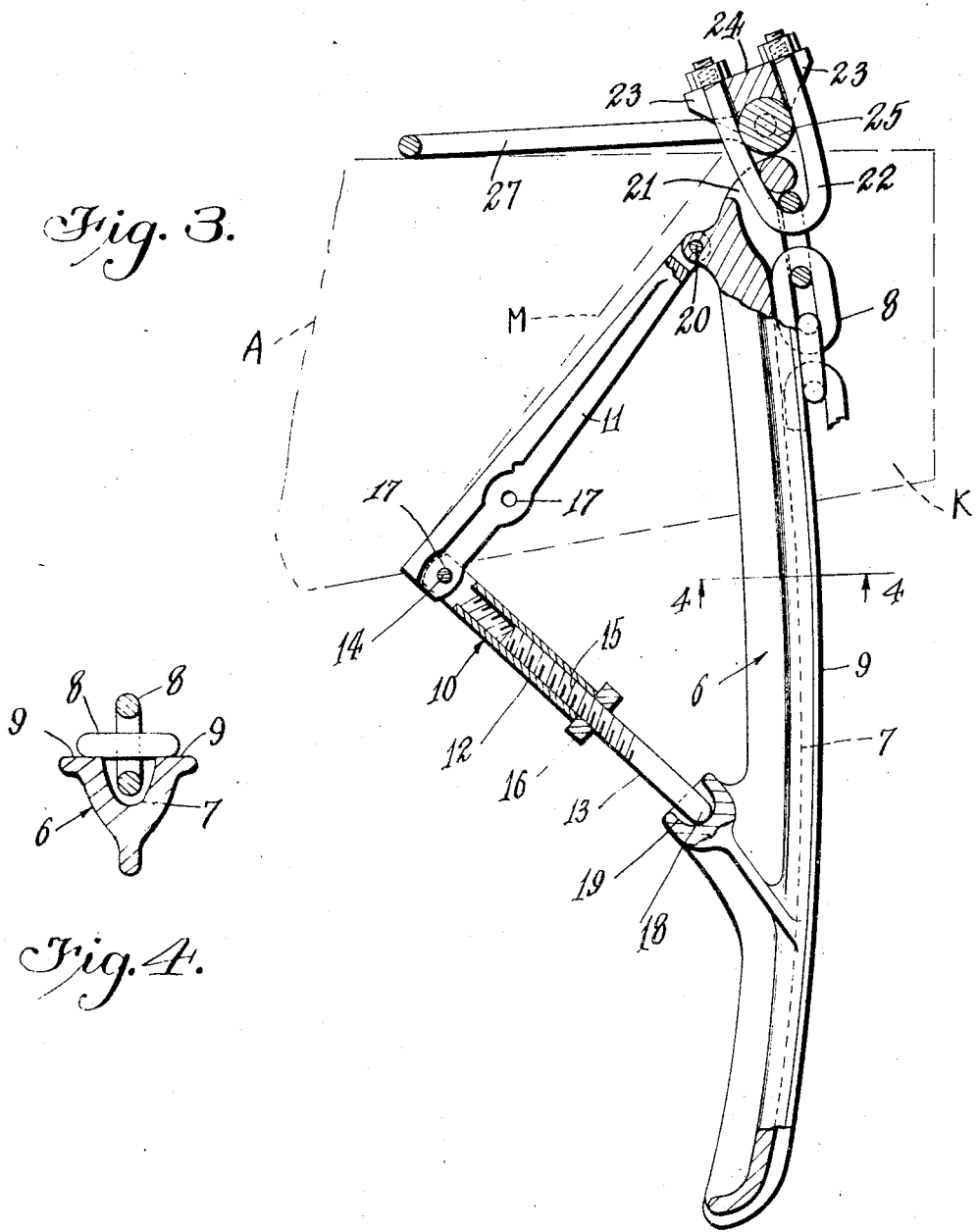
Fig. 3 is an enlarged side elevation, partly in section, of the horse head shown in Fig. 1, a fragment only of the flexible member being shown. A fragment of the operating member is indicated in broken lines.
Fig. 4 is an enlarged transverse section on the line indicated by 4—4, Fig. 3.

Since the bearing member 24 loosely rests on the bar 25, the bar 25 is free to rock in a vertical plane transversely of the operating member A, so that, if the upper face of the operating member A be inclined to the horizontal, transversely of the operating member, as shown in Fig. 2, the pull of the flexible member 8 will come uniformly on both ends of the bar 25, thus preventing any tendency to canting to either side of the stem 6 and, thus, avoiding the production of bending strains in the stem. Thus, the U-bolt 22 has a two-fold function in that it pivotally connects both the flexible member 8 and the stem 6 to the bearing member 24.

To the ends of the bar 25 is pivoted at 26 a bail 27 which is adapted to rest upon the upper face of the operating member A when the horse head is in use. When it is desired to lift the horse head off of the operating member, the hoisting tackle, not shown, will be attached to the bail 27. The bail is secured to the operating member by any suitable means. The securing means, in this instance, is preferably adjustable so that the bail 27 can be secured in slightly different positions, thus to properly center the flexible member 8 relative to the axis of the polish rod, after the horse head has been mounted on the operating member.

The device, indicated at 28, for adjustably securing the bail to the operating member may be of any suitable construction and, in this instance, includes a flexible member 29 which is passed through the bail 27. It will be clear from the foregoing that, after the device 28 is secured to the operating member, the bail 27 may be shifted lengthwise of the operating member into the desired position and then secured in such position by the device 28 against outward movement along the operating member. The adjustment of the bail 27 on the operating member may entail that the upper end portion of the section 11 be removed from contact with the rear slot wall M, but in any event the lower end portion of said section 11 will engage said rear slot wall so as to hold the stem 6 at the desired angle relative to the operating member A. The center from which the arcuate faces 9 of the stem 6 are generated is the axis of the fulcrum B, and the flexible member 8 leaves the faces 9 at a tangent when the stem 6 is at the top and bottom of the pumping stroke, thus entailing that, once the horse head is correctly adjusted on the operating member so that the pull of the flexible member 8 on the polish rod will be axially thereof, said pull will be maintained throughout the stroke of the operating member.

In installing the invention, the hoisting tackle, not shown, will be secured t the bail 27 and the horse head will then be swung into a position to rest the bar 25 on the upper face of the operating member. The bail 27 will then be shifted along the operating member until the axis of the flexible member 8 adjacent to the point at which the flexible member is tangential to the stem 6 is exactly vertical over the axis of the polish rod.

The chain 29 will then be secured so as to hold the bail 27 in the position to which it has been adjusted.

It will be readily seen that if, on account of the fulcrum B of the operating member being not absolutely horizontal, or the upper face of the operating member not being in a horizontal plane transversely of the operating member, the bar 25 is not horizontal, the stem 6 will swing relative to the bar 25 so that said stem will lie in a plane that cuts through the axis of the polish rod. Thus there will be no bending strains on the horse head tending to break it or tending to cant it to either side so that the flexible member 8 will not track accurately in the groove 7.

If relatively great adjustments in the angle of the section 11 are necessary, to secure the correct angular relation between the stem 6 and the operating member, the end 14 will be changed from one of the holes 17 to the other. Other adjustments will be made by screwing the section 13 in or out of the section 12.

The member J is rotatably supported in a fork P which may be pivotally connected by a pin 30 to a pair of eyes 31 which terminate the lower end of the flexible member 8.

It is to be noted that the pump and rods may be pulled without removing the horse head from the beam. To accomplish this, the beam is tilted with its horse head-supporting end up, and then the section 13 is removed from the socket 19 and the sections 11, 12 are collapsed, thus permitting the stem 6 to swing toward the beam and away from a position axially of the polish rod.

By providing the grooved stem and the flat faces 9 on opposite sides of the groove 7, the chain is prevented from rotating about its axis. In other words, by this construction, the chain operates the same as a rod would in so far as the tendency to twisting or turning is concerned. In preventing turning of the chain, excessive wear on the U-bolt 22 and on the chain and stem and on the connections between the chain and grip G is minimized.

I claim:

1. A horse head, comprising a grooved stem, a means connected to the stem adapted to engage the rear wall of the slot in the operating member to which the stem is connected, a flexible member lying in the groove, and a means to pivotally support the flexible member and stem on the operating member.

2. A horse head, comprising a bar, a bearing member loosely mounted on said bar, a grooved stem, a flexible member lying in the groove, a means connecting the flexible member and stem to the bearing member, and a means connected with the stem adapted to engage the rear slot wall in an operating member to hold the stem against swinging in the upper portion of the stroke of the operating member.

3. A horse head, comprising a bar, a bail pivotally connected to the ends of said bar, a bearing member loosely mounted on said bar, a stem provided with a groove, a flexible member lying in the groove, a means connecting the flexible member and stem to the bearing member, and a means connected with the stem for engaging the rear wall of a slot in the operating member on which the bar is mounted.

4. A horse head, comprising a grooved stem provided with an eye at its upper end, a U-bolt engaging said eye, a flexible member lying in the groove and connected with the U-bolt, a bar adapted to rest on an operating member, a bearing member loosely mounted on said bar and secured to the U-bolt, and a means connected with the stem and engaging the operating member to hold the stem against swinging when the operating member moves in the upper part of the stroke.

5. A horse head, comprising a stem provided with an arcuate groove and provided at its upper end with an eye, a bar adapted to rest on an operating member, a bearing loosely mounted on said bar, a U-bolt extending through the eye and secured to the bearing member, a flexible member extending through the U-bolt and engaging the groove, and a device connected with the stem and adapted to engage the operating member to hold the stem against swinging when the operating member is moving in the upper portion of its stroke.

6. A horse head, comprising a stem provided with an arcuate groove, a section pivoted at its upper end to the stem, a means connecting the lower end of said section to the stem, said means including two relatively adjustable sections for regulating the angle of said first mentioned section, a flexible member lying in the groove, and a means to pivotally support the flexible member and the stem on the upper face of an operating member.

7. A horse head comprising a stem provided with a groove and with an arcuate face, a chain having some of its links in the groove and others resting against said face, a means to connect the chain to an operating member, and a means to hold the stem against swinging including a section pivotally connected at its upper end to the stem and adapted to extend aslant downwardly away from said stem and an adjustable connection between the lower end of said section and the stem.

8. A horse head comprising a stem provided with a groove and with an arcuate face, a chain having some of its links in the groove and others resting against said face, and a means to connect the stem and chain to an operating member including a section pivotally connected at its upper end to the stem and adapted to extend aslant downwardly away from said stem and an adjustable connection between the lower end of said section and the stem.

9. A horse head comprising a bar, a bail pivotally connected to the ends of said bar, a bearing member loosely mounted on said bar, a stem connected with the bearing member and provided with an arcuate face, a flexible member resting against said face, a means connecting the flexible member to the bearing member, and a means connected with the stem for engaging the rear wall of a slot in the operating member on which the bar is mounted.

10. A horse head comprising a grooved stem, a means connected to the stem adapted to engage the rear wall of the slot in an operating member to which the stem is adapted to be connected, a flexible member lying in the groove, and a means to support the flexible member and stem on the operating member.

11. A horse head comprising a bar, a bearing member loosely mounted on said bar, a grooved stem, a flexible member lying in the groove, a means connecting the flexible member with the bearing member, and a means connected with the stem adapted to engage the rear slot wall in an operating member to hold the stem against swinging in the upper portion of the stroke of said operating member.

12. A horse head comprising a stem provided with an arcuate face, a section pivoted at its upper end to the stem, a means connecting the lower end of said section to the stem, said means including two relatively adjustable sections for regulating the angle of said first mentioned section, a flexible member lying against the arcuate face, and a means to support the flexible member on the upper face of an operating member.

13. A horse head comprising a stem provided with an arcuate face, a section pivotally connected at its upper end to the stem and adapted to extend aslant downwardly away from the stem, a means to adjustably connect the lower end of said section with the stem, a flexible member lying against the arcuate face, and a means to support the flexible member from an operating member.

Signed at Los Angeles, California, this 4th day of April, 1928.

JAMES P. RATIGAN.